US012289627B2

(12) United States Patent
Zhu et al.

(10) Patent No.: US 12,289,627 B2
(45) Date of Patent: Apr. 29, 2025

(54) MOTION-BASED BEAM MANAGEMENT TECHNIQUES IN WIRELESS COMMUNICATIONS

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/579,747

(22) Filed: Jan. 20, 2022

(65) Prior Publication Data

US 2023/0232257 A1 Jul. 20, 2023

(51) Int. Cl.
*H04W 24/08* (2009.01)
*H04B 7/06* (2006.01)
*H04W 4/02* (2018.01)
*H04W 36/08* (2009.01)

(52) U.S. Cl.
CPC .......... *H04W 24/08* (2013.01); *H04B 7/0695* (2013.01); *H04W 4/025* (2013.01); *H04W 36/08* (2013.01)

(58) Field of Classification Search
CPC .... H04B 7/0695; H04W 4/025; H04W 4/027; H04W 24/08; H04W 24/10; H04W 72/046; H04W 76/11
USPC ........................................ 370/252, 329, 331
See application file for complete search history.

(56) References Cited

U.S. PATENT DOCUMENTS

| | | | | |
|---|---|---|---|---|
| 2020/0404644 | A1* | 12/2020 | Zhu ..................... | H04W 72/046 |
| 2021/0314785 | A1* | 10/2021 | Raghavan ............. | H04W 76/11 |
| 2021/0392536 | A1* | 12/2021 | Fujimura .............. | H04W 24/10 |
| 2022/0231883 | A1* | 7/2022 | Chou .................... | H04W 24/10 |
| 2022/0322122 | A1* | 10/2022 | Fujimura .............. | H04W 4/027 |

FOREIGN PATENT DOCUMENTS

WO WO-2020263925 A1 12/2020

OTHER PUBLICATIONS

Partial International Search Report—PCT/US2022/082169—ISA/EPO—Apr. 6, 2023.
International Search Report and Written Opinion—PCT/US2022/082169—ISA/EPO—Jun. 6, 2023.

* cited by examiner

*Primary Examiner* — Harun Chowdhury
(74) *Attorney, Agent, or Firm* — Dalei Dong; Holland & Hart LLP

(57) ABSTRACT

Methods, systems, and devices for wireless communications are described that provide for a user equipment (UE) to detect motion of the UE based on a motion sensor, such as an inertial measurement unit (IMU). The UE, based on the detected motion, may trigger a measurement procedure in which measurements of different beams or cells are performed at a greater periodicity than if the motion were not detected. The indication from the motion sensor may indicate that UE acceleration, rotation, orientation, or any combinations thereof, exceeds a threshold and results in the UE switching to a fastest available measurement periodicity. After triggering the fastest available measurement periodicity, the UE may adjust the measurement periodicity based on newly obtained beam measurements and converge to a measurement periodicity based on observed metrics.

30 Claims, 13 Drawing Sheets

Reference Signal(s) 215

Measurement Report 220

MOTION-BASED BEAM MANAGEMENT TECHNIQUES IN WIRELESS COMMUNICATIONS

FIELD OF TECHNOLOGY

The following relates to wireless communications, including motion-based beam management techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may communicate with a base station using uplink and downlink communications, in which different antennas, different beams, or combinations thereof, may be used for uplink transmissions and for downlink receptions. In such systems, it may be appropriate for the UE to support techniques for antenna or beam switching.

SUMMARY

The described techniques relate to improved methods, systems, devices, and apparatuses that support motion-based beam management techniques in wireless communications. In accordance with various aspects, the described techniques provide for a user equipment (UE) to detect motion of the UE that may result reduced channel quality of a current beam that is used for communications with a base station. In some cases, based on the detected motion, the UE may trigger a measurement procedure in which measurements of different beams are performed and the measurements evaluated to determine whether criteria for a beam switch or cell handover is met. In some cases, the motion may be detected at the UE by a motion sensor, such as an inertial measurement unit (IMU), and beam or neighbor cell measurements may be triggered when the UE has been stationary or has movement that is less than a threshold value for a determined time period (e.g., 5 seconds) prior to the motion detection at the IMU. In some cases, an indication from the IMU may indicate that UE acceleration, rotation, orientation, or any combinations thereof, exceeds a threshold and results in the UE switching to a fastest available measurement periodicity. After triggering the fastest available measurement periodicity, the UE may adjust the measurement periodicity based on newly obtained beam measurements and converge to a measurement periodicity according to established beam measurement techniques.

A method for wireless communication at a user equipment (UE) is described. The method may include measuring, during a first time period, one or more beams according to a first measurement periodicity, determining, based on an indication from a motion sensor, that a movement of the UE exceeds a first movement threshold value, and measuring, during a second time period, the one or more beams according to a second measurement periodicity to obtain a second set of measurements, where the second measurement periodicity is greater than the first measurement periodicity.

An apparatus for wireless communication at a UE is described. The apparatus may include a processor, memory coupled with the processor, and instructions stored in the memory. The instructions may be executable by the processor to cause the apparatus to measure, during a first time period, one or more beams according to a first measurement periodicity, determine, based on an indication from a motion sensor, that a movement of the UE exceeds a first movement threshold value, and measure, during a second time period, the one or more beams according to a second measurement periodicity to obtain a second set of measurements, where the second measurement periodicity is greater than the first measurement periodicity.

Another apparatus for wireless communication at a UE is described. The apparatus may include means for measuring, during a first time period, one or more beams according to a first measurement periodicity, means for determining, based on an indication from a motion sensor, that a movement of the UE exceeds a first movement threshold value, and means for measuring, during a second time period, the one or more beams according to a second measurement periodicity to obtain a second set of measurements, where the second measurement periodicity is greater than the first measurement periodicity.

A non-transitory computer-readable medium storing code for wireless communication at a UE is described. The code may include instructions executable by a processor to measure, during a first time period, one or more beams according to a first measurement periodicity, determine, based on an indication from a motion sensor, that a movement of the UE exceeds a first movement threshold value, and measure, during a second time period, the one or more beams according to a second measurement periodicity to obtain a second set of measurements, where the second measurement periodicity is greater than the first measurement periodicity.

Some examples of the method, apparatuses, and non-transitory computer-readable medium described herein may further include operations, features, means, or instructions for determining that the movement of the UE is less than a second movement threshold value for a first time period prior to the indication from the motion sensor that the movement of the UE exceeds the first movement threshold value. In some examples of the method, apparatuses, and non-transitory computer-readable medium described herein, the motion sensor indicates one or more of UE acceleration, UE rotation, UE orientation, or any combinations thereof. In some examples of the method, apparatuses, and non-transitory computer-readable medium described herein, the second measurement periodicity corresponds to a fastest measurement rate for measuring the one or more beams.

Some examples of the method, apparatuses, and non-transitory computer-readable medium described herein may further include operations, features, means, or instructions for determining, based on measurements of the one or more beams according to the second measurement periodicity, a third measurement periodicity for one or more subsequent beam measurements. In some examples of the method, apparatuses, and non-transitory computer-readable medium described herein, the third measurement periodicity corresponds to the first measurement periodicity, the second measurement periodicity, or a different measurement periodicity than the first measurement periodicity or the second measurement periodicity. In some examples of the method, apparatuses, and non-transitory computer-readable medium described herein, the first measurement periodicity is a product of a first sampling multiplier and a reference time period, and the second measurement periodicity is a product of a second sampling multiplier and the reference time period, and where the second sampling multiplier is less than the first sampling multiplier. In some examples of the method, apparatuses, and non-transitory computer-readable medium described herein, the first sampling multiplier may be greater than one to provide that the first measurement periodicity is a multiple of two or more reference time periods and the second sampling multiplier is equal to one to provide that the second measurement periodicity corresponds to one measurement per reference time period. In some examples of the method, apparatuses, and non-transitory computer-readable medium described herein, the reference time period may be provided in a SMTC from a base station.

In some examples of the method, apparatuses, and non-transitory computer-readable medium described herein, the measuring the one or more beams according to the second measurement periodicity may include operations, features, means, or instructions for triggering a one-shot measurement at fastest measurement rate, and where a subsequent measurement frequency is determined based on a rate of change of one or more measurements of the one-shot measurement. Some examples of the method, apparatuses, and non-transitory computer-readable medium described herein may further include operations, features, means, or instructions for initiating one or more of a beam switch or a cell handover based on the measuring the one or more beams according to the second measurement periodicity. In some examples of the method, apparatuses, and non-transitory computer-readable medium described herein, the motion sensor may be an IMU that includes one or more of an accelerometer, a gyroscope, or a magnetic sensor.

DETAILED DESCRIPTION

Figure 1:
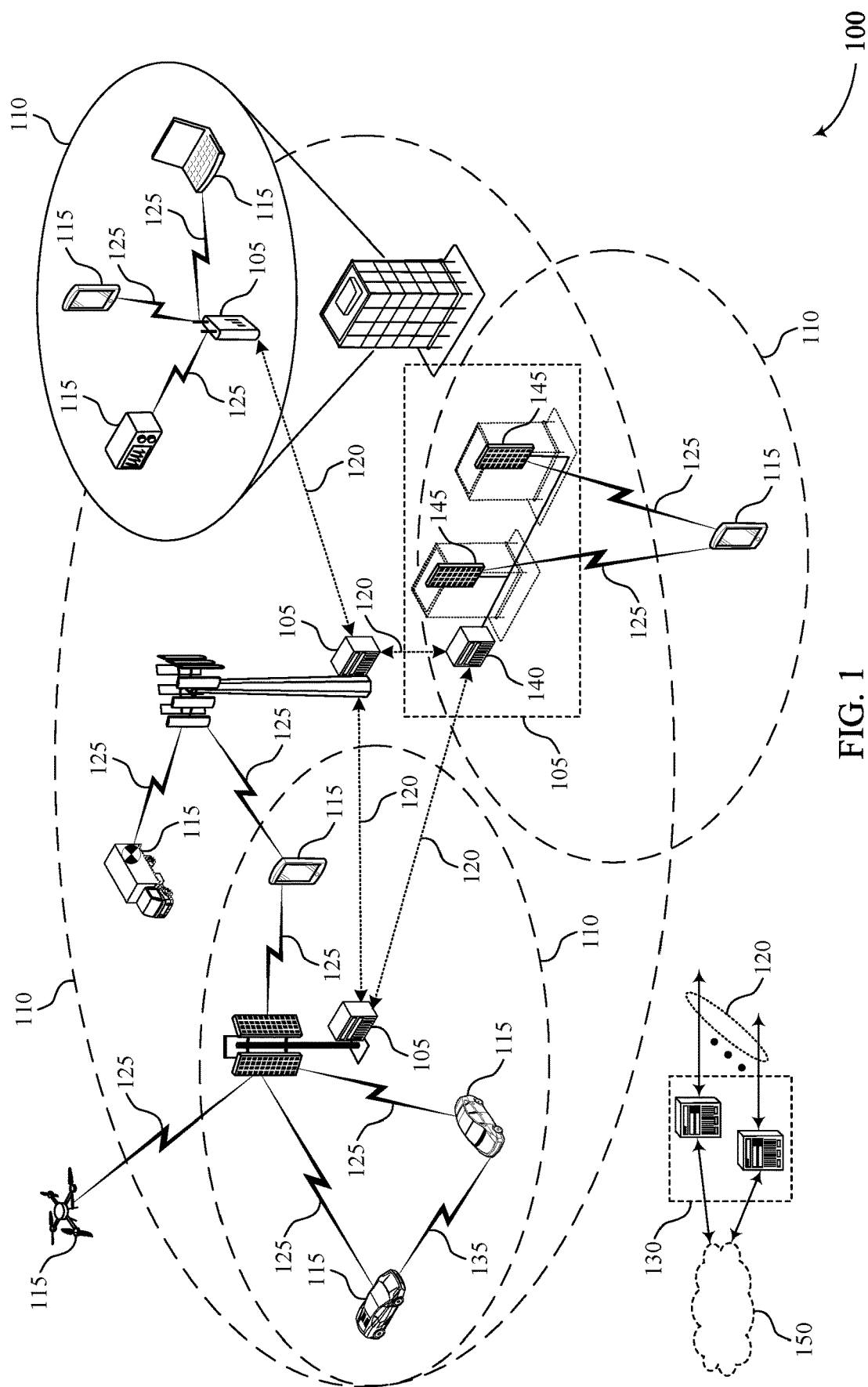
FIG. 1 illustrates an example of a wireless communications system that supports motion-based beam management techniques in wireless communications in accordance with aspects of the present disclosure.

In some wireless communications systems, a user equipment (UE) may communicate with one or more base stations or cells using one or more beams for uplink communications, downlink communications, or both. When selecting a beam or cell, the UE may obtain measurements from multiple beams or cells, and identify a beam or cell with suitable characteristics that support wireless communications. Once a connection is established with one or more beams or cells, the UE may perform beam tracking based on measurements of synchronization signal block (SSBs) or physical broadcast channel (PBCH) transmissions to determine if a beam switch or cell handover is to be performed in order to maintain reliable wireless communications.

In some cases, a periodicity of performing such measurements may depend upon a rate of change of measurements between consecutive measurement reports, such that a stationary or largely stationary UE performs measurements at a lower periodicity (e.g., with a longer time period between measurements) than a UE that is experiencing higher mobility. Such techniques may provide power conservation to low mobility or stationary UEs through fewer measurement procedures, while allowing faster-moving UEs to perform measurements more frequently in order to switch beams or cells more quickly if needed. However, if the UE has been stationary for some time, beam tracking or sweeping measurements may take place at their slowest pace, and if the UE has a sudden movement a subsequent beam measurement may not be performed for a relatively long period of time. Such a delay in the subsequent beam measurement may delay the UE from tracking to a suitable measurement periodicity for its level of mobility (e.g. the proper "panic mode"), and may result in poor communications reliability until the UE is able to move to a more suitable measurement periodicity and establish or change beams in accordance with the new UE movement.

In accordance with various aspects as discussed herein, in some cases where a UE has been stationary or has movement that is less than a threshold value for a predetermined period of time (e.g., 5 seconds), the UE may trigger a higher measurement periodicity (e.g., by performing measurements at a highest rate) upon detection of non-stationary movement at an inertial measurement unit (IMU) of the UE. In some cases, an indication from the IMU may indicate that UE acceleration, rotation, orientation, or any combinations thereof, exceeds a threshold value and results in the UE switching to the higher measurement periodicity (e.g., to perform beam measurements at a fastest measurement rate). In some cases, after triggering the more frequent measurements, the UE may adjust the measurement periodicity based on newly obtained beam measurements and converge to the appropriate measurement periodicity (e.g., an appropriate panic mode) according to existing techniques for beam measurements. Such a one-shot trigger of the fastest available measurement periodicity may enhance UE performance by increasing communications reliability and lowering latency, due to a higher likelihood that the proper beam or cell being selected for communications when the UE transitions between mobility states.

Aspects of the disclosure are initially described in the context of wireless communications systems. Aspects of the disclosure are further illustrated by and described with reference to sensor inputs, apparatus diagrams, system diagrams, and flowcharts that relate to motion-based beam management techniques in wireless communications.

FIG. 1 illustrates an example of a wireless communications system 100 that supports motion-based beam management techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a UE 115 may perform periodic measurements which may be used to determine whether a beam switch or cell handover is to be performed. The periodicity of such measurements may be based on a mobility of the UE 115. In accordance with various aspects discussed herein, in some cases when the UE 115 has been stationary or has movement that is less than a threshold value for a predetermined period of time (e.g., 5 seconds), the UE 115 may trigger a higher measurement periodicity (e.g., by performing measurements at a highest rate) upon detection of non-stationary movement at an IMU of the UE 115. In some cases, an indication from the IMU may indicate that UE 115 acceleration, rotation, orientation, or any combinations thereof, exceeds a threshold value and results in the UE 115 switching to the higher measurement periodicity (e.g., to perform beam measurements at a fastest measurement rate). In some cases, after triggering the more frequent measurements, the UE 115 may adjust the measurement periodicity based on newly obtained beam measurements and converge to a suitable measurement periodicity according to existing techniques for beam measurements.

Figure 2:
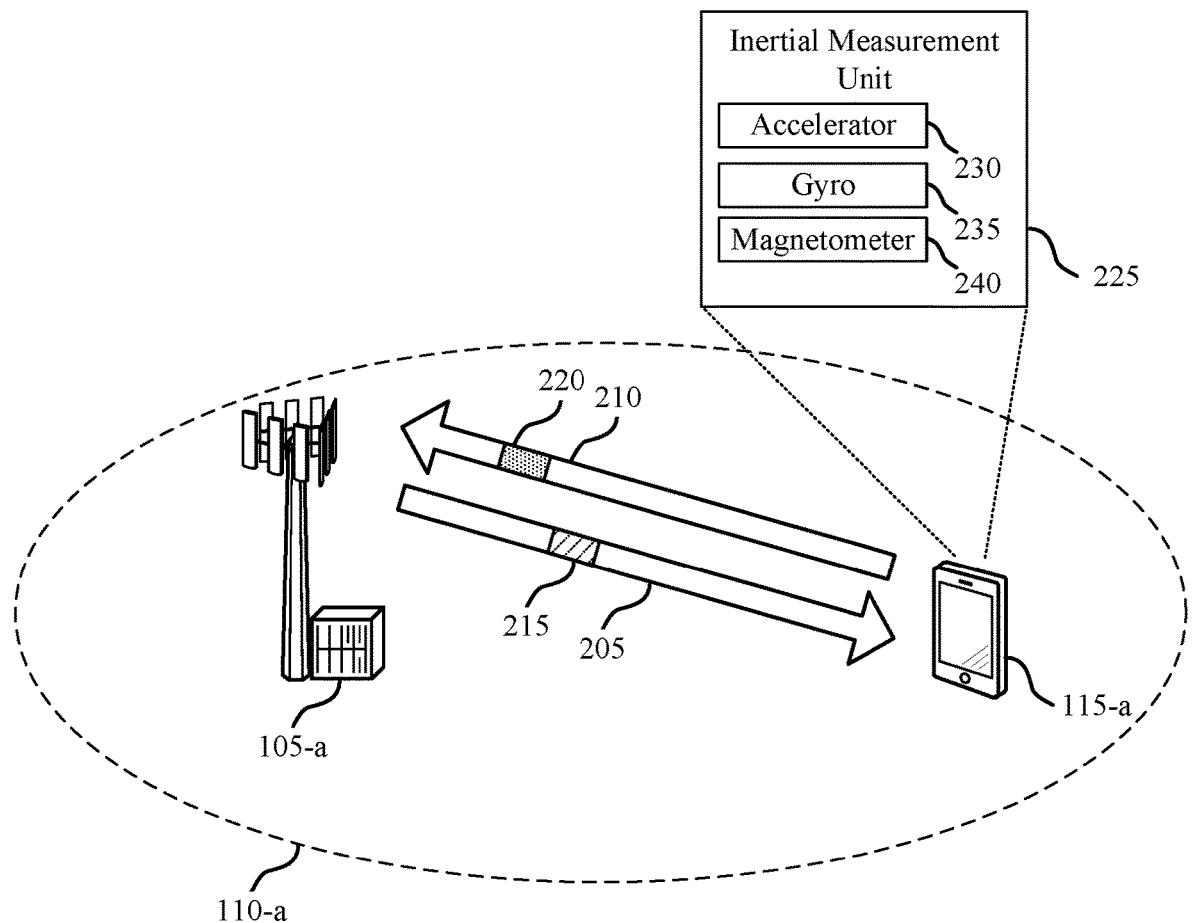
FIG. 2 illustrates an example of a wireless communications system that supports motion-based beam management techniques in wireless communications in accordance with aspects of the present disclosure.
Figure 2:
Figure 2:

FIG. 2 illustrates an example of a wireless communications system 200 that supports motion-based beam management techniques in wireless communications in accordance with aspects of the present disclosure. In some examples, wireless communications system 200 may implement aspects of wireless communications system 100. In the example of FIG. 2, wireless communications system 200 may include base station 105-*a* and UE 115-*a*, which may be examples of the corresponding devices described with respect to FIG. 1. Base station 105-*a* may provide network coverage for geographic coverage area 110-*a*. The base station 105-*a* may transmit downlink communications 205 to the UE 115-*a*, and the UE 115-*a* may transmit uplink communications 210 to the base station 105-*a*.

To support communications between base station 105-*a* and UE 115-*a*, the base station 105-*a* may transmit one or more reference signals 215 (e.g., channel state information (CSI) reference signals, synchronization signal blocks (SSBs), demodulation reference signals (DMRSs), tracking reference signals (TRSs), reference signals in physical broadcast channels (PBCHs), and the like). The UE 115-*a* may measure one or more metrics of received reference signals 215 and provide a measurement report 220 to the base station 105-*a*. The UE 115-*a*, in some cases, may identify one or beams or cells and associated measurements, which may trigger a beam switch or cell handover, based on one or more metrics from the measurements of the reference signals 215.

In some cases, measurements of the reference signals 215 may be performed at the UE 115-*a* based on a measurement periodicity that is in use at the UE. Such measurement periodicities may be selected based on how quickly channel conditions are changing, or expected to change, at the UE 115-*a*. For example, a measurement periodicity (also referred to as search periodicity) may be adjusted based on changes in channel conditions, which may provide for cell handovers or beam switches that are timed to occur prior to a communications degradation or failure. In some cases, the measurement periodicity may be set based on a particular "panic mode" in which the UE 115-*a* is operating. Further, in some cases, particularly when performing beam switches, such switches may occur at a relatively high signal to noise ratio (SNR) due to relatively narrow beamwidths.

In some cases, beam tracking/sweeping may be scheduled at the pace of ($M*T_{REF}$), where a nominal period for $T_{REF}$ may be based on a configuration of SSBs or SSB measurement and timing configuration (SMTC), and M is a down-sampling multiplier. In some cases, a typical value for $T_{REF}$ may be 20 ms. The down-sampling multiplier M, in some cases, may be set to be the ratio of estimated beam dwell time in terms of $T_{REF}$ and scheduling list size. For example, in cases where UE 115-*a* is stationary, a large value of M may be suitable to monitor channel conditions and provide beam tracking/sweeping at a relatively slow pace, which may allow for reduced power consumption at the UE 115-*a*. While a relatively low measurement rate (e.g., a small measurement periodicity) may allow for reduced power consumption at the UE 115-*a*, such measurements may not detect motion start until a next beam tracking/sweeping occasion, which can result in a relatively long delay due the small measurement periodicity for the UE 115-*a* when stationary for a period of time (e.g., the time period between measurements may be as long as 1 second).

In some aspects, the UE 115-*a* may monitor an IMU 225 at the UE 115-*a*, which may indicate that the UE 115-*a* is stationary or non-stationary. In the example of FIG. 2, the IMU 225 includes an acceleration sensor 230, a gyroscopic sensor 235, and a magnetic sensor 240, which may provide one or more outputs that are monitored to determine that the UE 115-*a* is in motion or not. For example, in cases where the acceleration sensor 230, gyroscopic sensor 235, and magnetic sensor 240, give outputs or a change in orientation that is less than a threshold value, the UE 115-*a* may be considered to be stationary. In some cases, the UE 115-*a* may trigger a one-shot fast measurement mode (e.g., a super beam panic mode) in which a largest measurement periodicity (e.g., the value of M is set to be one) when the IMU 225 indicates a non-stationary UE 115-*a* for a first time within the past defined period of time (e.g., 5 sec). Such a one-shot measurement mode may provide that measurements are taken at a fast rate to initiate any needed beam switches or cell handovers, and then the UE 115-*a* may transition to a different measurement periodicity based on the newly obtained measurements (e.g., in accordance with existing techniques for adjusting measurement periodicity). Such a one-shot measurement mode may allow the UE 115-*a* to determine appropriate actions efficiently upon detection of UE 115-*a* motion, to set the appropriate measurement periodicity, initiate a beam switch or cell handover, or any combinations thereof. Thus, measurements of reference signal received power (RSRP), signal to noise ratio (SNR), spectral efficiency, and the like, may be performed at rates that are suitable to the current UE 115-*a* movement.

Figure 3:
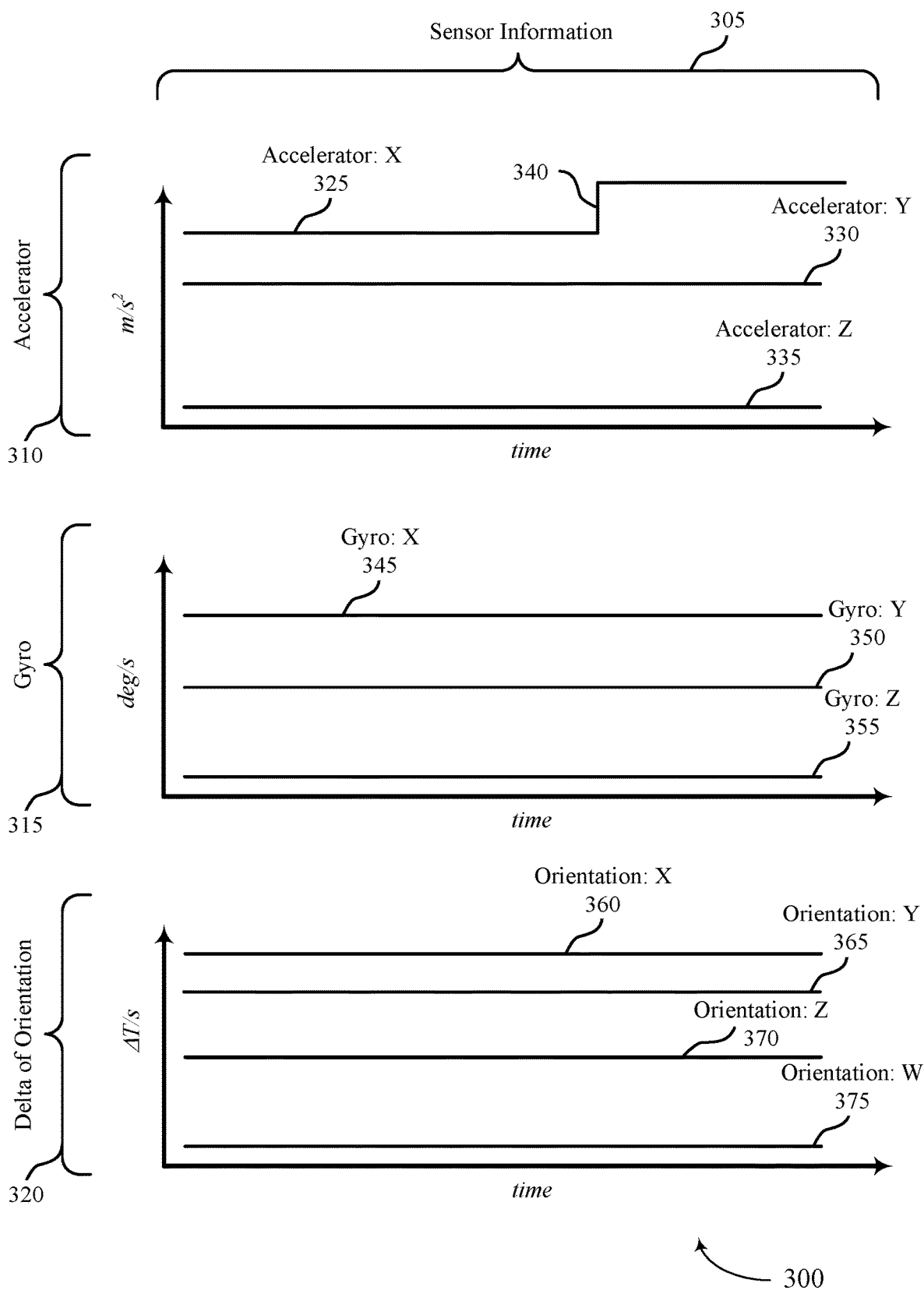
FIG. 3 illustrates an example of motion sensor inputs that support motion-based beam management techniques in wireless communications in accordance with aspects of the present disclosure.

FIG. 3 illustrates an example of a motion sensor inputs 300 that supports motion-based beam management techniques in wireless communications in accordance with aspects of the present disclosure. In some examples, motion sensor inputs 300 may implement or be implemented in aspects of wireless communications system 100 or 200, as described with reference to FIGS. 1 and 2.

In this example, sensor information 305 may include accelerator sensor information 310, gyroscopic sensor information 315, and delta-of-orientation sensor information 320 (e.g., from a magnetic sensor or a combination of multiple different sensors of an IMU). For example, the accelerator sensor information 310 may include measurements of acceleration (e.g., in meters/second) for an accelerator X axis 325, an accelerator Y axis 330, and an accelerator Z axis 335. In this example, at point 340, the accelerator X axis 325 indicates that the UE has started motion in the X direction. Such a motion indication, in cases where the UE has been stationary or has had measured motion less than a threshold value (e.g., for a time threshold value), may trigger a one-shot measurement at fastest measurement rate. Continuing with the example of FIG. 3, the gyroscopic sensor information 315 may include measurements (e.g., angular velocity measurements in degrees per second) from a gyroscope X axis 345, from a gyroscope Y axis 350, and a gyroscope Z axis 355. Further, the delta-of-orientation sensor information 320 may include measurements (e.g., in a change in magnetic field per second or ΔT/s) from an orientation X 360, an orientation Y 365, an orientation Z 370, and an orientation W 375 (e.g., a homogeneous vertex coordinate). As discussed, if any one or more of the measurements show UE movement that exceeds a threshold value, the UE may trigger a one-shot measurement at fastest measurement rate, which may allow the UE to initiate a beam or cell switch, or adjust a measurement periodicity in accordance with the current UE movement.

Figure 4:
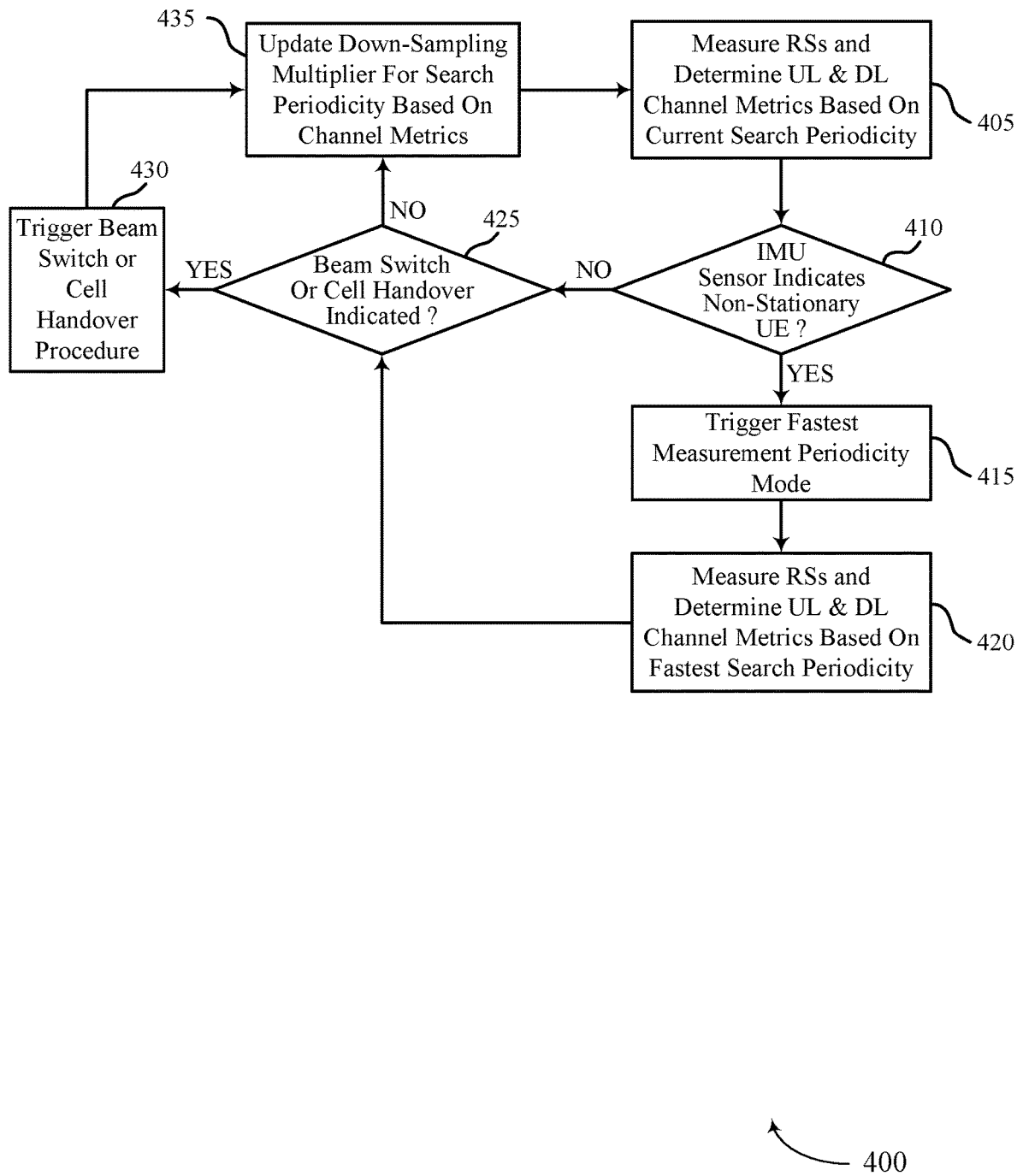
FIG. 4 illustrates an example of a flow chart of a motion-based beam management technique in accordance with aspects of the present disclosure.

FIG. 4 illustrates an example of a flow chart 400 that supports motion-based beam management techniques in wireless communications in accordance with aspects of the present disclosure. The operations of the flow chart 400 may be implemented by a UE or its components as described herein. For example, the operations of the flow chart 400 may be performed by a UE 115 as described herein. In some examples, a UE or associated components may execute a set of instructions to control the functional elements of the UE to perform the described functions. Additionally or alternatively, the UE may perform aspects of the described functions using special-purpose hardware. Operations shown and discussed in the example of FIG. 4 may be performed in a different order than the example order shown, or the operations performed may be performed in different orders or at different times. Some operations may be combined or omitted and other operations may be added to the method of FIG. 4.

In this example, at 405, the UE may measure one or more reference signals (e.g., a CSI-RS, SSB, TRS, DMRS, PBCH, or other reference signal that may be transmitted by the base station) based on a first search periodicity, and determine one or more uplink and downlink channel metrics. For example, the UE may measure a parameter (e.g., a RSRP, SINR, SNR, etc.) of one or more reference signals according to a measurement periodicity that is based on changes of measurements from prior measurements, as discussed herein.

At 410, the UE may determine if a motion sensor (e.g., an IMU sensor) indicates that the UE is non-stationary. In some cases, such a determination may be made based on the UE being in a stationary state (e.g., with motion sensor measurements that are less than a threshold value) for a predetermined time period (e.g., 5 seconds) prior to the UE motion sensor indicating that the UE is non-stationary (e.g., with one or more motion sensor measurements that exceed a corresponding threshold value). If it is determined at 410 that the UE is non-stationary, the UE may trigger a fastest measurement periodicity mode, as indicated at 415 (e.g., a one-shot measurement at a fastest measurement rate). At 420, the UE may measure reference signals and determine associated channel metrics based on the fastest search periodicity.

At 425, responsive to a determination that the UE is stationary or subsequent to the measurements as the fastest search periodicity, the UE may determine whether a beam switch of cell handover is indicated. In some cases, such a determination may be made based on the measured channel metrics of a current serving beam or serving cell, and metrics of one or more other cells or beams. If it is determined at 425 that a beam switch or cell handover is indicated, the UE may trigger a beam switch or cell handover procedure, as indicated at 430. In some cases, the UE may not make such a determination and may simply transmit a measurement report to a serving base station that makes a beam switch or cell handover determination. At 435, the UE may update the measurement periodicity based on the measured channel metrics (e.g., may update the down-sampling multiplier (M) based on the most current measurements and one or more sets of prior measurements. Such a process may continue again at block 405 with the UE measuring reference signals in accordance with the current search periodicity.

Figure 5:
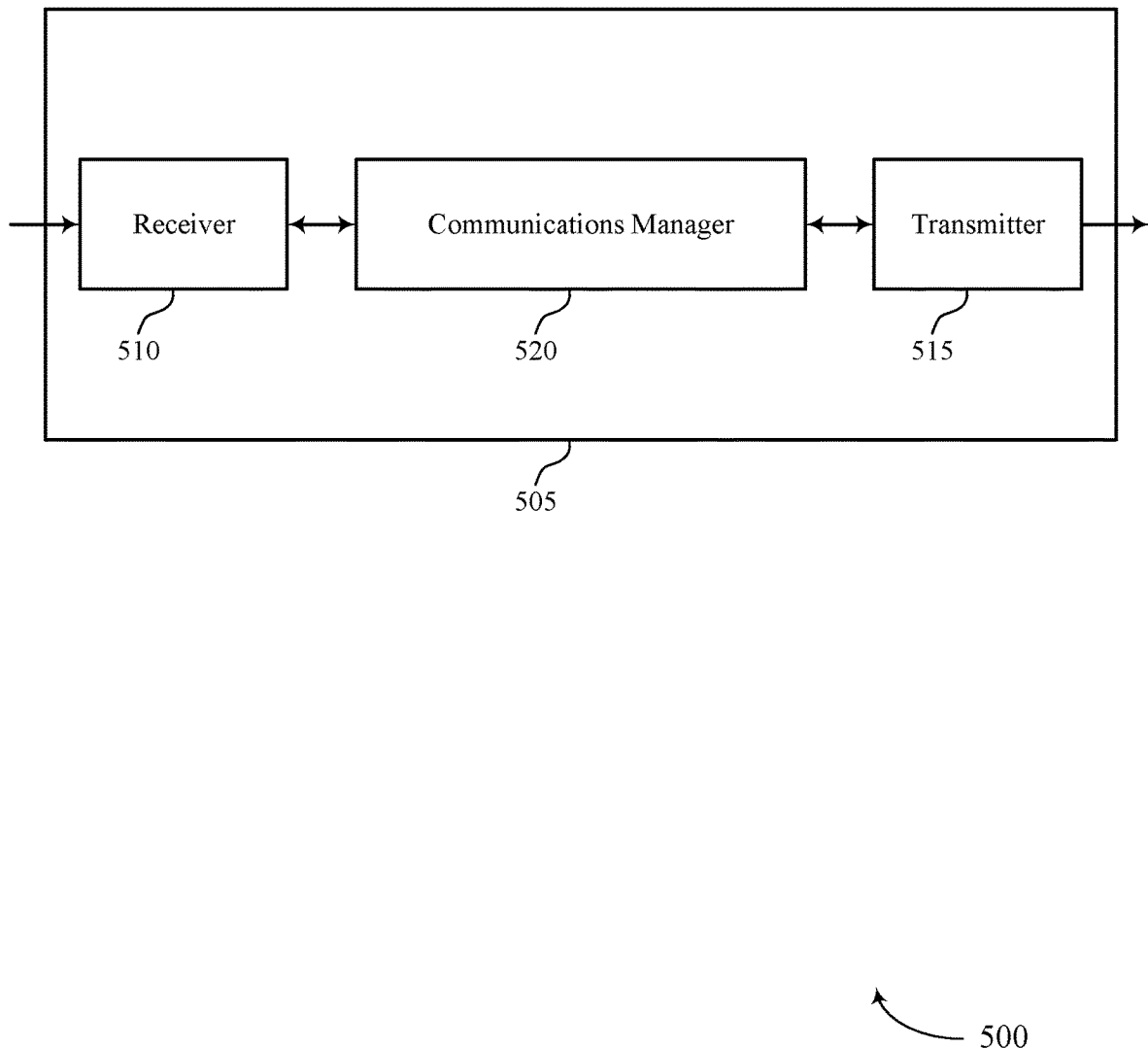
FIGS. 5 and 6 show block diagrams of devices that support motion-based beam management techniques in wireless communications in accordance with aspects of the present disclosure.

FIG. 5 shows a block diagram 500 of a device 505 that supports motion-based beam management techniques in wireless communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to motion-based beam management techniques in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to motion-based beam management techniques in wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of motion-based beam management techniques in wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for measuring, during a first time period, one or more beams according to a first measurement periodicity. The communications manager 520 may be configured as or otherwise support a means for determining, based on an indication from a motion sensor, that a movement of the UE exceeds a first movement threshold value. The communications manager 520 may be configured as or otherwise support a means for measuring, during a second time period, the one or more beams according to a second measurement periodicity to obtain a second set of measurements, where the second measurement periodicity is greater than the first measurement periodicity.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for motion-based measurement periodicity adjustments that may enhance UE performance by increasing communications reliability and lowering latency, due to a higher likelihood that the proper beam or cell being selected for communications when the UE transitions between mobility states.

Figure 6:
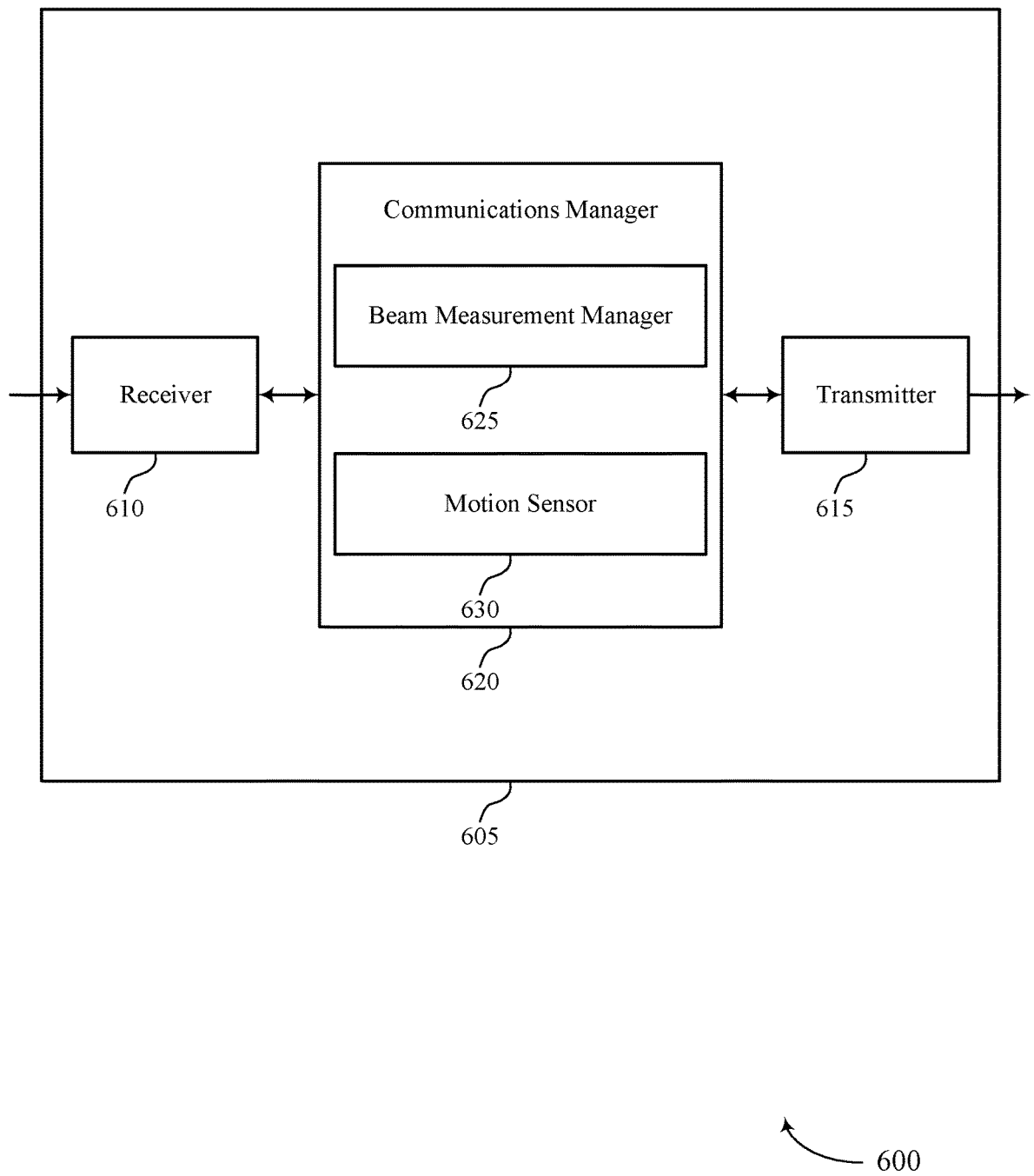

FIG. 6 shows a block diagram 600 of a device 605 that supports motion-based beam management techniques in wireless communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to motion-based beam management techniques in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to motion-based beam management techniques in wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of motion-based beam management techniques in wireless communications as described herein. For example, the communications manager 620 may include a beam measurement manager 625 a motion sensor 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The beam measurement manager 625 may be configured as or otherwise support a means for measuring, during a first time period, one or more beams according to a first measurement periodicity. The motion sensor 630 may be configured as or otherwise support a means for determining, based on an indication from a motion sensor, that a movement of the UE exceeds a first movement threshold value. The beam measurement manager 625 may be configured as or otherwise support a means for measuring, during a second time period, the one or more beams according to a second measurement periodicity to obtain a second set of measurements, where the second measurement periodicity is greater than the first measurement periodicity.

Figure 7:
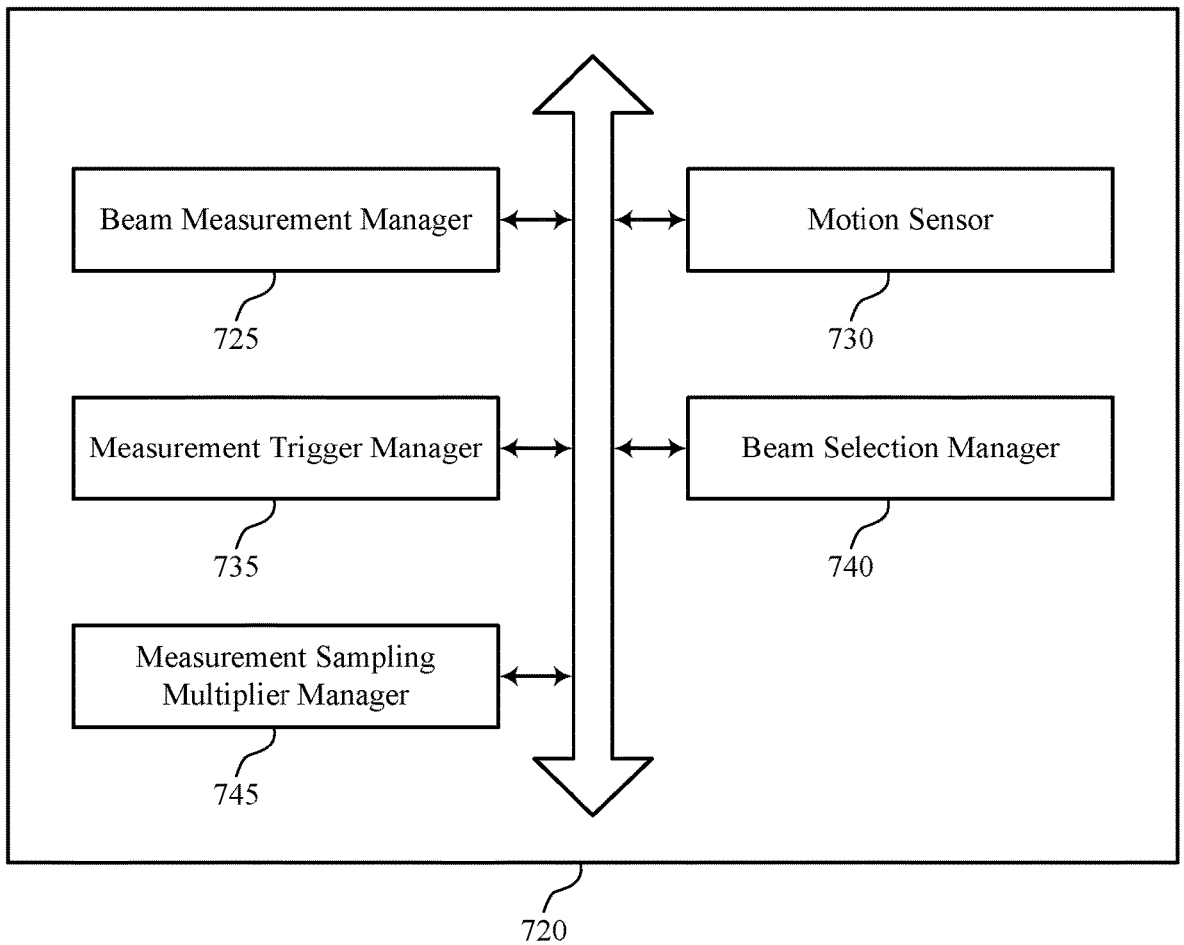
FIG. 7 shows a block diagram of a communications manager that supports motion-based beam management techniques in wireless communications in accordance with aspects of the present disclosure.

FIG. 7 shows a block diagram 700 of a communications manager 720 that supports motion-based beam management techniques in wireless communications in accordance with aspects of the present disclosure. The communications manager 720 may be an example of aspects of a communications manager 520, a communications manager 620, or both, as described herein. The communications manager 720, or various components thereof, may be an example of means for performing various aspects of motion-based beam management techniques in wireless communications as described herein. For example, the communications manager 720 may include a beam measurement manager 725, a motion sensor 730, a measurement trigger manager 735, a beam selection manager 740, a measurement sampling multiplier manager 745, or any combination thereof. Each of these components may communicate, directly or indirectly, with one another (e.g., via one or more buses).

The communications manager 720 may support wireless communication at a UE in accordance with examples as disclosed herein. The beam measurement manager 725 may be configured as or otherwise support a means for measuring, during a first time period, one or more beams according to a first measurement periodicity. The motion sensor 730 may be configured as or otherwise support a means for determining, based on an indication from a motion sensor, that a movement of the UE exceeds a first movement threshold value. In some examples, the beam measurement manager 725 may be configured as or otherwise support a means for measuring, during a second time period, the one or more beams according to a second measurement periodicity to obtain a second set of measurements, where the second measurement periodicity is greater than the first measurement periodicity.

In some examples, the measurement trigger manager 735 may be configured as or otherwise support a means for determining that the movement of the UE is less than a second movement threshold value for a first time period prior to the indication from the motion sensor that the movement of the UE exceeds the first movement threshold value. In some examples, the motion sensor indicates one or more of UE acceleration, UE rotation, UE orientation, or any combinations thereof. In some examples, the second measurement periodicity corresponds to a fastest measurement rate for measuring the one or more beams.

In some examples, the beam measurement manager 725 may be configured as or otherwise support a means for determining, based on measurements of the one or more beams according to the second measurement periodicity, a third measurement periodicity for one or more subsequent beam measurements. In some examples, the third measurement periodicity corresponds to the first measurement periodicity, the second measurement periodicity, or a different measurement periodicity than the first measurement periodicity or the second measurement periodicity. In some examples, the first measurement periodicity is a product of a first sampling multiplier and a reference time period, and the second measurement periodicity is a product of a second sampling multiplier and the reference time period, and where the second sampling multiplier is less than the first sampling multiplier. In some examples, the first sampling multiplier is greater than one to provide that the first measurement periodicity is a multiple of two or more reference time periods. In some examples, the second sampling multiplier is equal to one to provide that the second measurement periodicity corresponds to one measurement per reference time period. In some examples, the reference time period is provided in a SMTC from a base station.

In some examples, to support measuring the one or more beams according to the second measurement periodicity, the measurement trigger manager 735 may be configured as or otherwise support a means for triggering a one-shot measurement at fastest measurement rate, and where a subsequent measurement frequency is determined based on a rate of change of one or more measurements of the one-shot measurement.

In some examples, the beam selection manager 740 may be configured as or otherwise support a means for initiating one or more of a beam switch or a cell handover based on the measuring the one or more beams according to the second measurement periodicity. In some examples, the motion sensor is an inertial measurement unit (IMU) that includes one or more of an accelerometer, a gyroscope, or a magnetic sensor.

Figure 8:
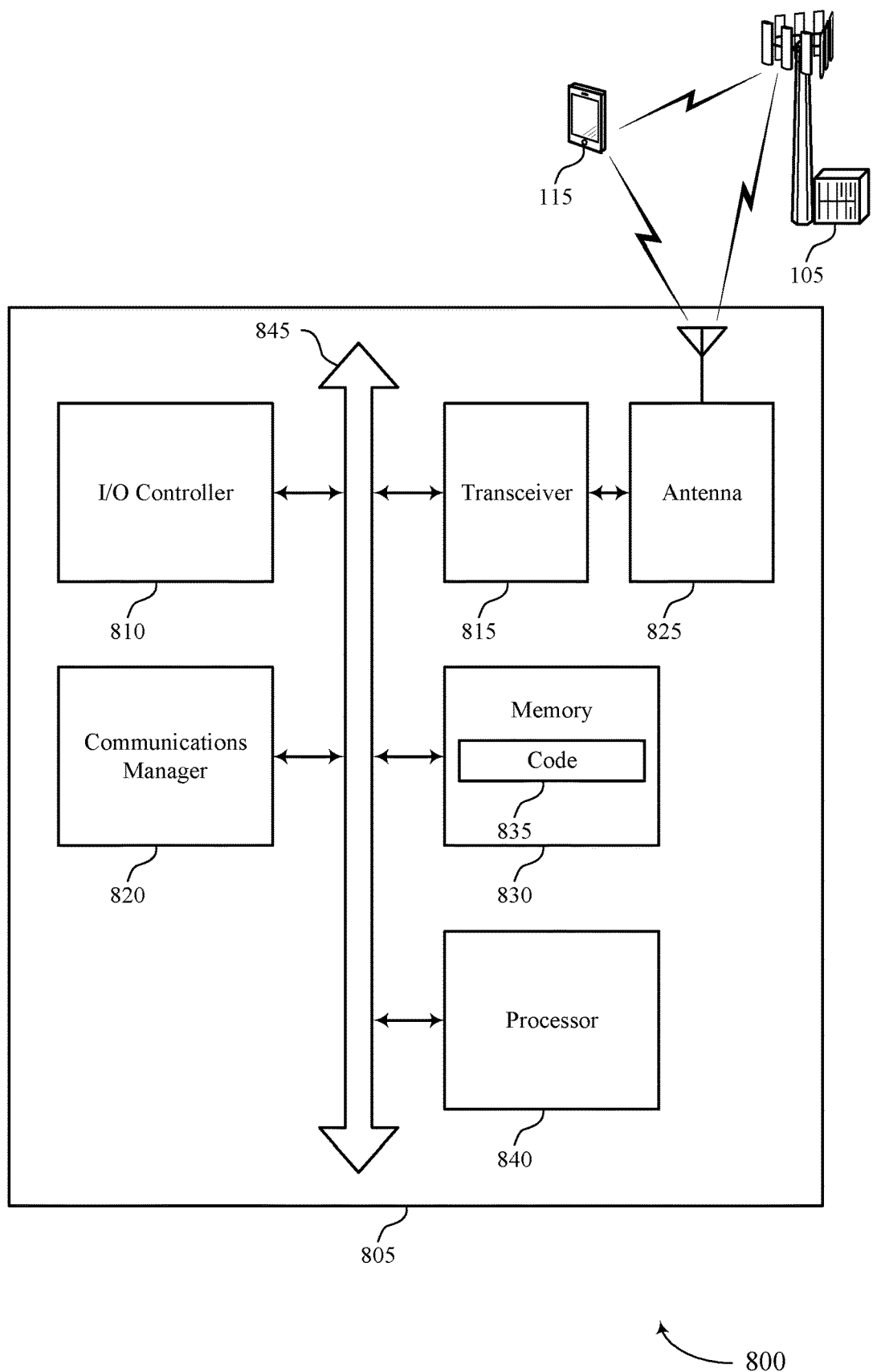
FIG. 8 shows a diagram of a system including a device that supports motion-based beam management techniques in wireless communications in accordance with aspects of the present disclosure.

FIG. 8 shows a diagram of a system 800 including a device 805 that supports motion-based beam management techniques in wireless communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting motion-based beam management techniques in wireless communications). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for measuring, during a first time period, one or more beams according to a first measurement periodicity. The communications manager 820 may be configured as or otherwise support a means for determining, based on an indication from a motion sensor, that a movement of the UE exceeds a first movement threshold value. The communications manager 820 may be configured as or otherwise support a means for measuring, during a second time period, the one or more beams according to a second measurement periodicity to obtain a second set of measurements, where the second measurement periodicity is greater than the first measurement periodicity.

By including or configuring the communications manager 820 in accordance with examples as described herein, the device 805 may support techniques for motion-based measurement periodicity adjustments that may enhance UE performance by increasing communications reliability and lowering latency, due to a higher likelihood that the proper beam or cell being selected for communications when the UE transitions between mobility states.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of motion-based beam management techniques in wireless communications as described herein, or the processor 840 and the memory 830 may be otherwise configured to perform or support such operations.

Figure 9:
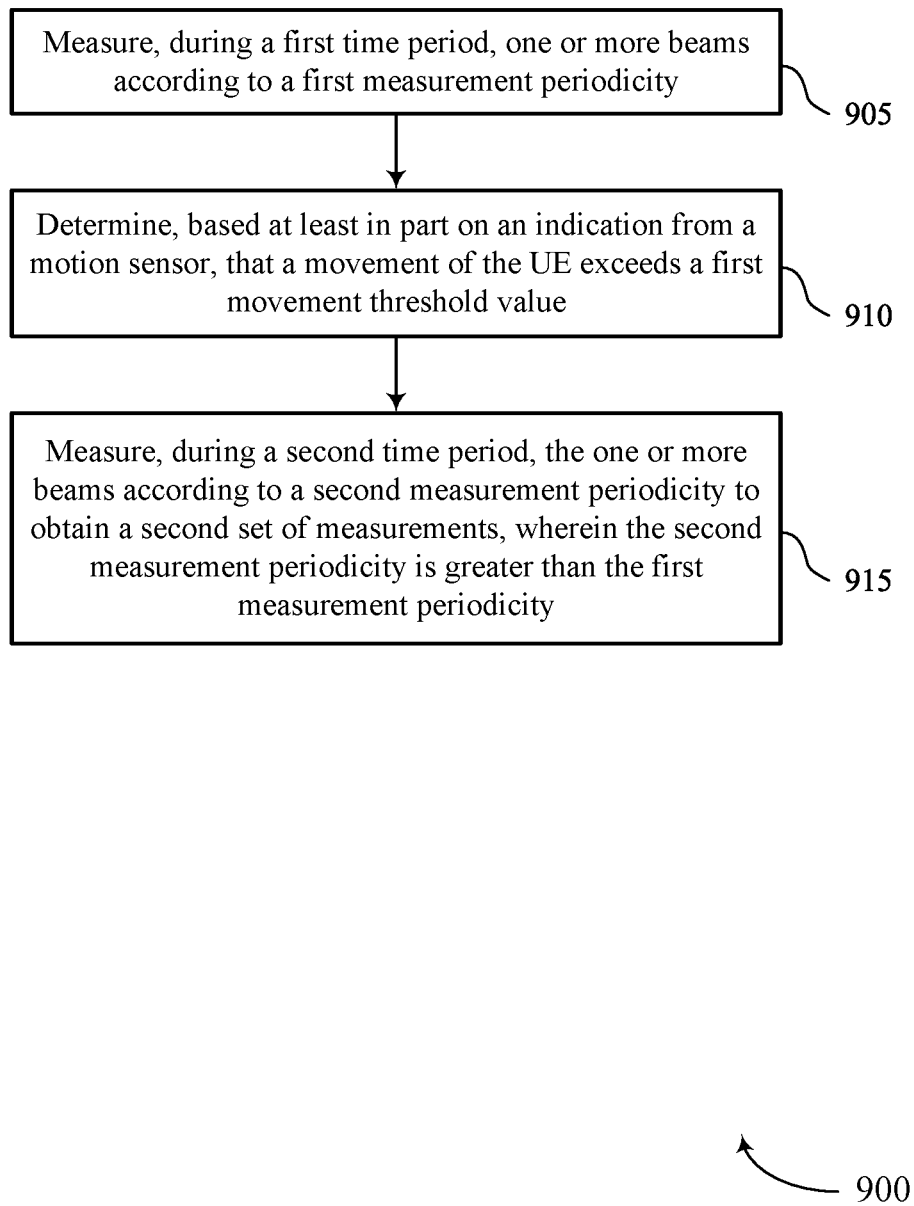
FIGS. 9 through 13 show flowcharts illustrating methods that support motion-based beam management techniques in wireless communications in accordance with aspects of the present disclosure.

FIG. 9 shows a flowchart illustrating a method 900 that supports motion-based beam management techniques in wireless communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include measuring, during a first time period, one or more beams according to a first measurement periodicity. The operations of 905 may be performed in accordance with examples as disclosed herein. In some examples, aspects of the operations of 905 may be performed by a beam measurement manager 725 as described with reference to FIG. 7.

At 910, the method may include determining, based on an indication from a motion sensor, that a movement of the UE exceeds a first movement threshold value. The operations of 910 may be performed in accordance with examples as disclosed herein. In some examples, aspects of the operations of 910 may be performed by a motion sensor 730 as described with reference to FIG. 7.

At 915, the method may include measuring, during a second time period, the one or more beams according to a second measurement periodicity to obtain a second set of measurements, where the second measurement periodicity is greater than the first measurement periodicity. The operations of 915 may be performed in accordance with examples as disclosed herein. In some examples, aspects of the operations of 915 may be performed by a beam measurement manager 725 as described with reference to FIG. 7.

Figure 10:
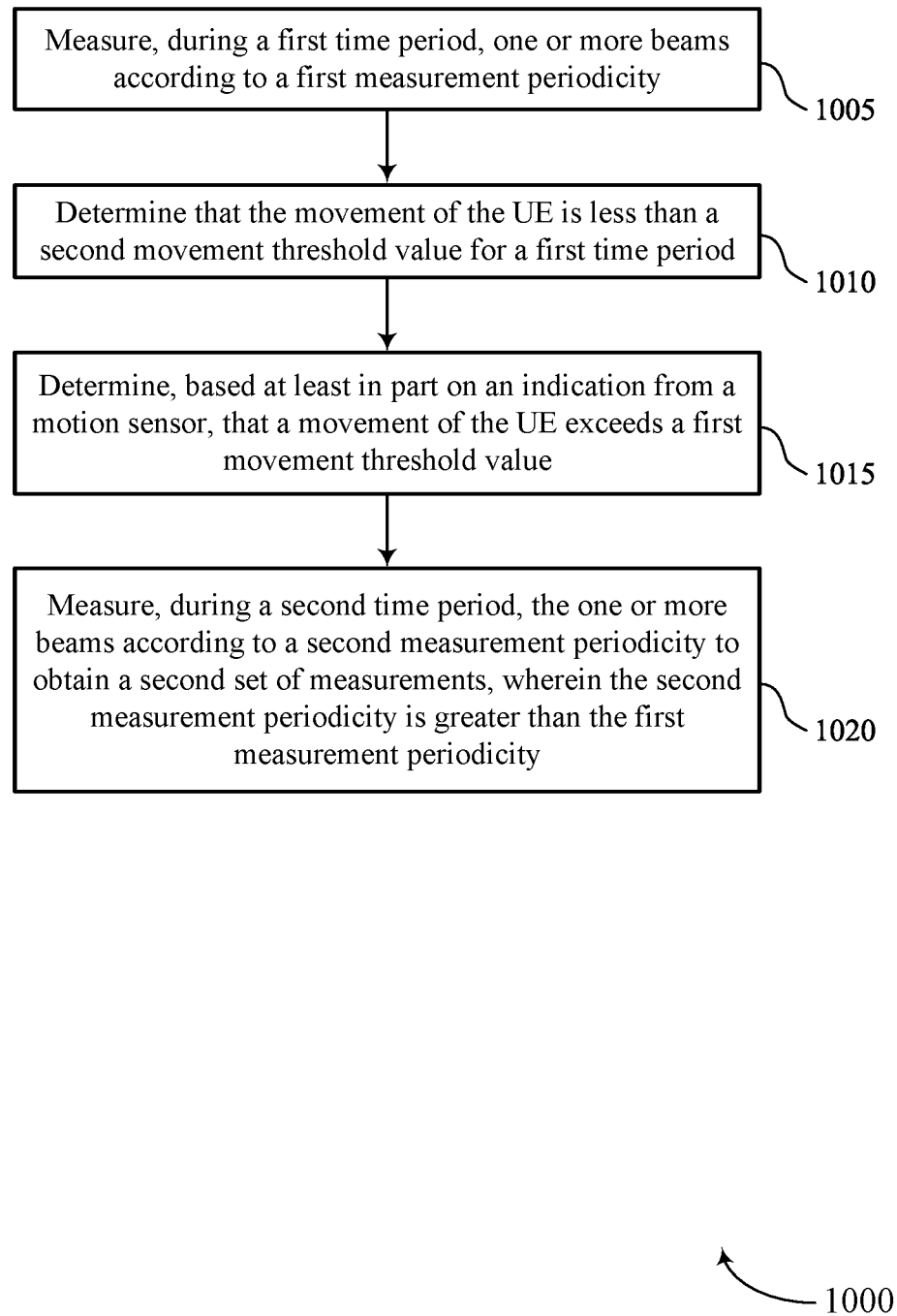

FIG. 10 shows a flowchart illustrating a method 1000 that supports motion-based beam management techniques in wireless communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include measuring, during a first time period, one or more beams according to a first measurement periodicity. The operations of 1005 may be performed in accordance with examples as disclosed herein. In some examples, aspects of the operations of 1005 may be performed by a beam measurement manager 725 as described with reference to FIG. 7.

At 1010, the method may include determining that the movement of the UE is less than a second movement threshold value for a first time period. The operations of 1010 may be performed in accordance with examples as disclosed herein. In some examples, aspects of the operations of 1010 may be performed by a measurement trigger manager 735 as described with reference to FIG. 7.

At 1015, the method may include determining, based on an indication from a motion sensor, that a movement of the UE exceeds a first movement threshold value. The operations of 1015 may be performed in accordance with examples as disclosed herein. In some examples, aspects of the operations of 1015 may be performed by a motion sensor 730 as described with reference to FIG. 7.

At 1020, the method may include measuring, during a second time period, the one or more beams according to a second measurement periodicity to obtain a second set of measurements, where the second measurement periodicity is greater than the first measurement periodicity. The operations of 1020 may be performed in accordance with examples as disclosed herein. In some examples, aspects of the operations of 1020 may be performed by a beam measurement manager 725 as described with reference to FIG. 7.

Figure 11:
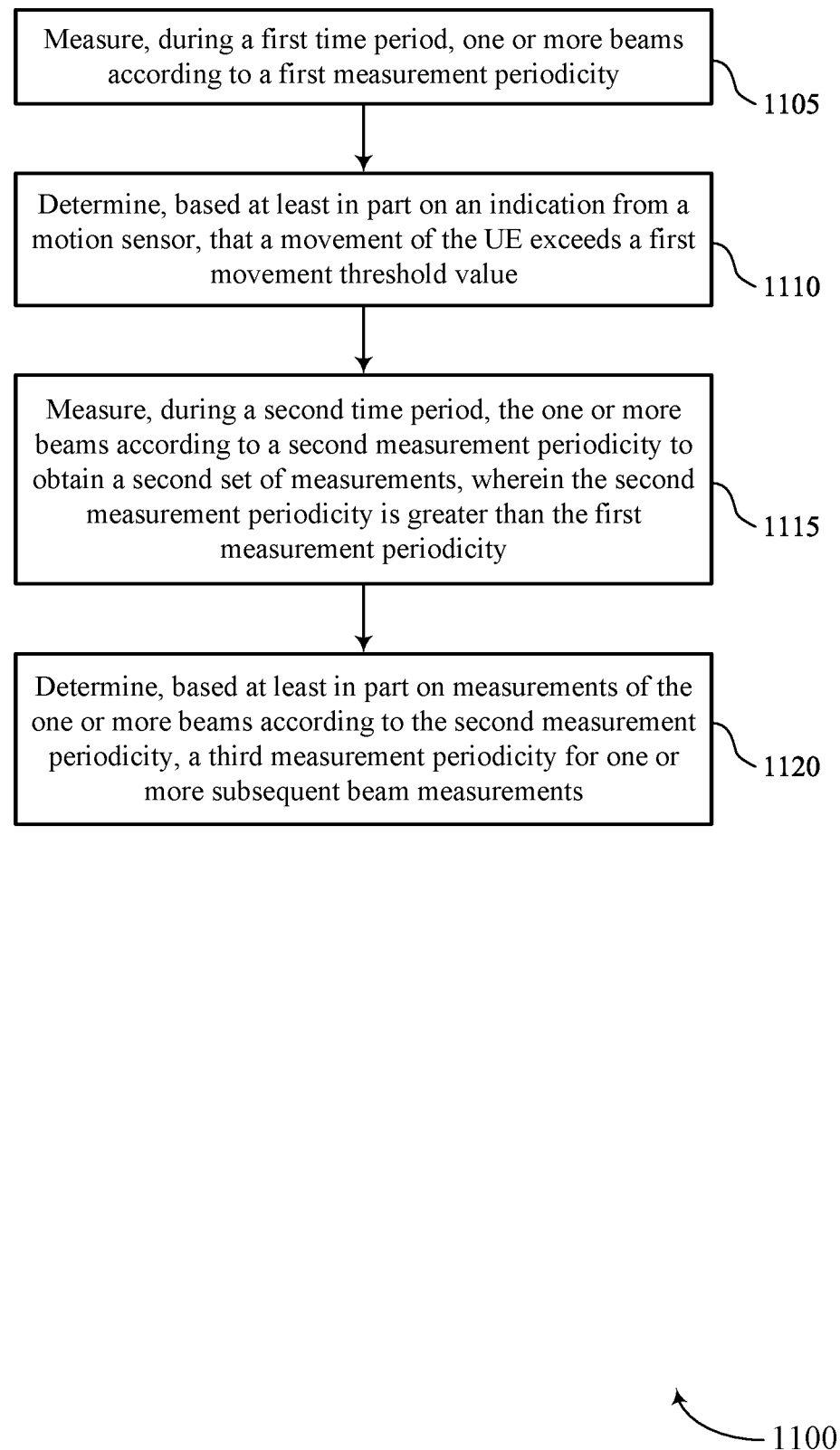

FIG. 11 shows a flowchart illustrating a method 1100 that supports motion-based beam management techniques in wireless communications in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include measuring, during a first time period, one or more beams according to a first measurement periodicity. The operations of 1105 may be performed in accordance with examples as disclosed herein. In some examples, aspects of the operations of 1105 may be performed by a beam measurement manager 725 as described with reference to FIG. 7.

At 1110, the method may include determining, based on an indication from a motion sensor, that a movement of the UE exceeds a first movement threshold value. The operations of 1110 may be performed in accordance with examples as disclosed herein. In some examples, aspects of the operations of 1110 may be performed by a motion sensor 730 as described with reference to FIG. 7.

At 1115, the method may include measuring, during a second time period, the one or more beams according to a second measurement periodicity to obtain a second set of measurements, where the second measurement periodicity is greater than the first measurement periodicity. The operations of 1115 may be performed in accordance with examples as disclosed herein. In some examples, aspects of the operations of 1115 may be performed by a beam measurement manager 725 as described with reference to FIG. 7. In some cases, the second measurement periodicity corresponds to a fastest measurement rate for measuring the one or more beams.

At 1120, the method may include determining, based on measurements of the one or more beams according to the second measurement periodicity, a third measurement periodicity for one or more subsequent beam measurements. The operations of 1120 may be performed in accordance with examples as disclosed herein. In some examples, aspects of the operations of 1120 may be performed by a beam measurement manager 725 as described with reference to FIG. 7. In some cases, the third measurement periodicity may correspond to the first measurement periodicity, the second measurement periodicity, or a different measurement periodicity than the first measurement periodicity or the second measurement periodicity.

Figure 12:
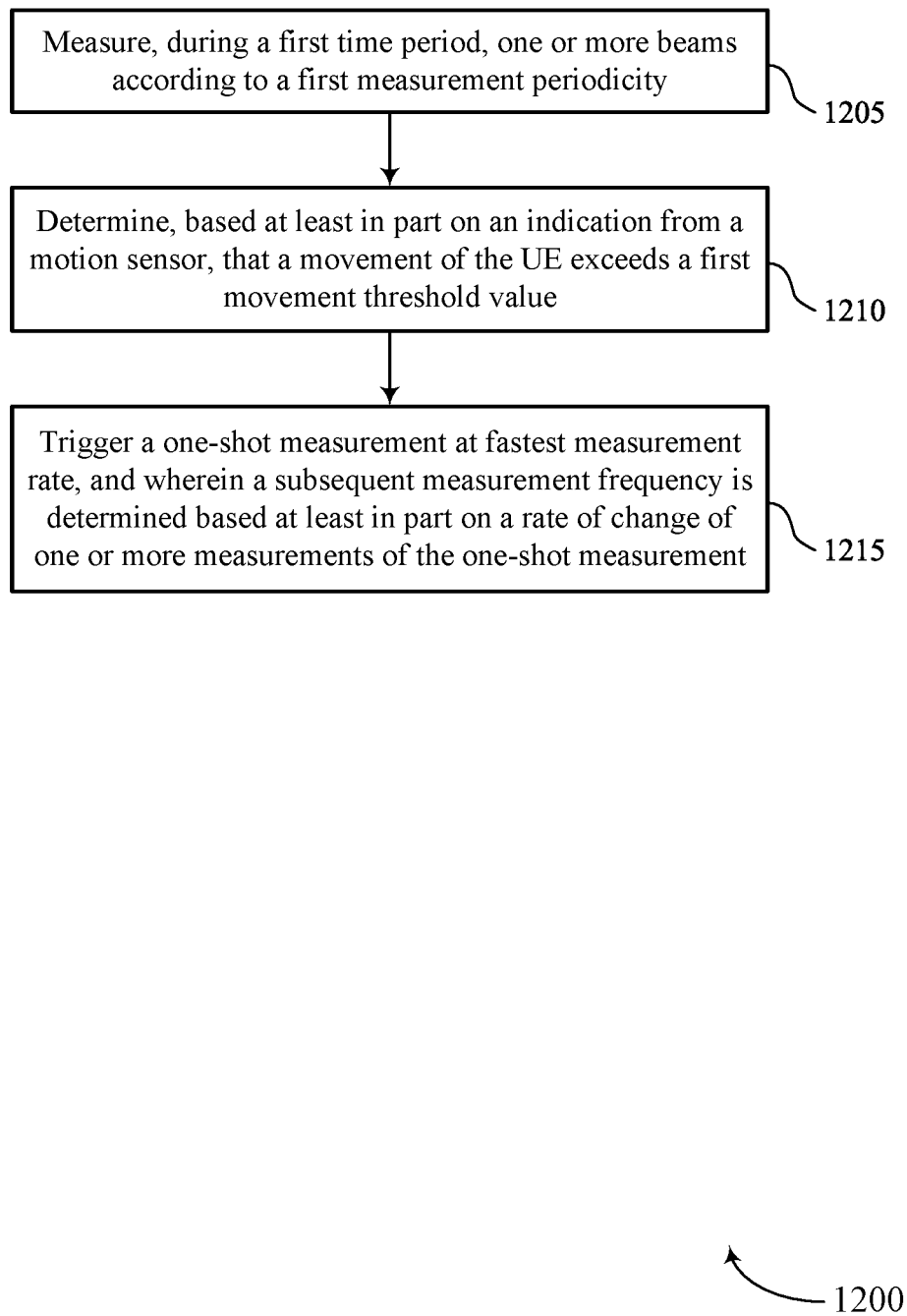

FIG. 12 shows a flowchart illustrating a method 1200 that supports motion-based beam management techniques in wireless communications in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include measuring, during a first time period, one or more beams according to a first measurement periodicity. The operations of 1205 may be performed in accordance with examples as disclosed herein. In some examples, aspects of the operations of 1205 may be performed by a beam measurement manager 725 as described with reference to FIG. 7.

At 1210, the method may include determining, based on an indication from a motion sensor, that a movement of the UE exceeds a first movement threshold value. The operations of 1210 may be performed in accordance with examples as disclosed herein. In some examples, aspects of the operations of 1210 may be performed by a motion sensor 730 as described with reference to FIG. 7.

At 1215, the method may include triggering a one-shot measurement at fastest measurement rate, and where a subsequent measurement frequency is determined based on a rate of change of one or more measurements of the one-shot measurement. The operations of 1215 may be performed in accordance with examples as disclosed herein. In some examples, aspects of the operations of 1215 may be performed by a measurement trigger manager 735 as described with reference to FIG. 7.

Figure 13:
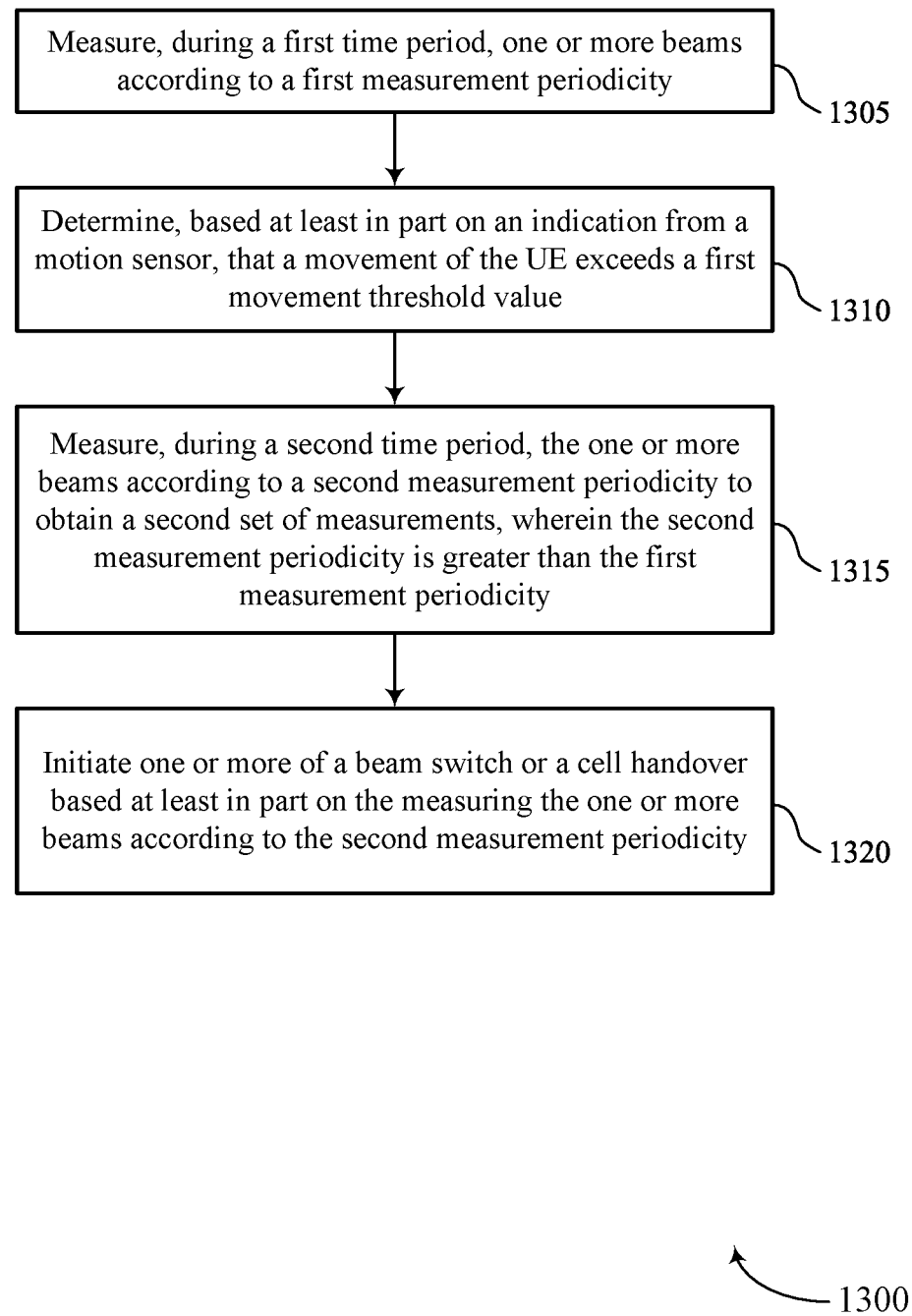

FIG. 13 shows a flowchart illustrating a method 1300 that supports motion-based beam management techniques in wireless communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include measuring, during a first time period, one or more beams according to a first measurement periodicity. The operations of 1305 may be performed in accordance with examples as disclosed herein. In some examples, aspects of the operations of 1305 may be performed by a beam measurement manager 725 as described with reference to FIG. 7.

At 1310, the method may include determining, based on an indication from a motion sensor, that a movement of the UE exceeds a first movement threshold value. The operations of 1310 may be performed in accordance with examples as disclosed herein. In some examples, aspects of the operations of 1310 may be performed by a motion sensor 730 as described with reference to FIG. 7.

At 1315, the method may include measuring, during a second time period, the one or more beams according to a second measurement periodicity to obtain a second set of measurements, where the second measurement periodicity is greater than the first measurement periodicity. The operations of 1315 may be performed in accordance with examples as disclosed herein. In some examples, aspects of the operations of 1315 may be performed by a beam measurement manager 725 as described with reference to FIG. 7.

At 1320, the method may include initiating one or more of a beam switch or a cell handover based on the measuring the one or more beams according to the second measurement periodicity. The operations of 1320 may be performed in accordance with examples as disclosed herein. In some examples, aspects of the operations of 1320 may be performed by a beam selection manager 740 as described with reference to FIG. 7.

The following provides an overview of aspects of the present disclosure:

Aspect 1: A method for wireless communication at a UE, comprising: measuring, during a first time period, one or more beams according to a first measurement periodicity; determining, based at least in part on an indication from a motion sensor, that a movement of the UE exceeds a first movement threshold value; and measuring, during a second time period, the one or more beams according to a second measurement periodicity to obtain a second set of measurements, wherein the second measurement periodicity is greater than the first measurement periodicity.

Aspect 2: The method of aspect 1, further comprising: determining that the movement of the UE is less than a second movement threshold value for a first time period prior to the indication from the motion sensor that the movement of the UE exceeds the first movement threshold value.

Aspect 3: The method of any of aspects 1 through 2, wherein the motion sensor indicates one or more of UE acceleration, UE rotation, UE orientation, or any combinations thereof.

Aspect 4: The method of any of aspects 1 through 3, wherein the second measurement periodicity corresponds to a fastest measurement rate for measuring the one or more beams.

Aspect 5: The method of aspect 4, further comprising: determining, based at least in part on measurements of the one or more beams according to the second measurement periodicity, a third measurement periodicity for one or more subsequent beam measurements.

Aspect 6: The method of aspect 5, wherein the third measurement periodicity corresponds to the first measurement periodicity, the second measurement periodicity, or a different measurement periodicity than the first measurement periodicity or the second measurement periodicity.

Aspect 7: The method of any of aspects 1 through 6, wherein the first measurement periodicity is a product of a first sampling multiplier and a reference time period, and the second measurement periodicity is a product of a second sampling multiplier and the reference time period, and wherein the second sampling multiplier is less than the first sampling multiplier.

Aspect 8: The method of aspect 7, wherein the first sampling multiplier is greater than one to provide that the first measurement periodicity is a multiple of two or more reference time periods, and the second sampling multiplier is equal to one to provide that the second measurement periodicity corresponds to one measurement per reference time period.

Aspect 9: The method of any of aspects 7 through 8, wherein the reference time period is provided in a SMTC from a base station.

Aspect 10: The method of any of aspects 1 through 9, wherein the measuring the one or more beams according to the second measurement periodicity comprises: triggering a one-shot measurement at fastest measurement rate, and wherein a subsequent measurement frequency is determined based at least in part on a rate of change of one or more measurements of the one-shot measurement.

Aspect 11: The method of any of aspects 1 through 10, further comprising: initiating one or more of a beam switch or a cell handover based at least in part on the measuring the one or more beams according to the second measurement periodicity.

Aspect 12: The method of any of aspects 1 through 11, wherein the motion sensor is an IMU that includes one or more of an accelerometer, a gyroscope, or a magnetic sensor.

Aspect 13: An apparatus for wireless communication at a UE, comprising a processor; memory coupled with the processor; and instructions stored in the memory and executable by the processor to cause the apparatus to perform a method of any of aspects 1 through 12.

Aspect 14: An apparatus for wireless communication at a UE, comprising at least one means for performing a method of any of aspects 1 through 12.

Aspect 15: A non-transitory computer-readable medium storing code for wireless communication at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
measuring, during a first time period, one or more beams according to a first measurement periodicity;

determining, based at least in part on an indication from a motion sensor, that a movement of the UE exceeds a first movement threshold value; and measuring, during a second time period and based at least in part on the determination that the UE exceeds the first movement threshold value, the one or more beams according to a second measurement periodicity to obtain a second set of measurements, wherein the second measurement periodicity is greater than the first measurement periodicity, and wherein the one or more beams are measured in accordance with a one-shot measurement mode at the second measurement periodicity, and wherein the one-shot measurement mode includes a measurement of each reference signal instance during the second time period.

2. The method of claim 1, further comprising:

determining that the movement of the UE is less than a second movement threshold value for a first time period prior to the indication from the motion sensor that the movement of the UE exceeds the first movement threshold value.

3. The method of claim 1, wherein the motion sensor indicates one or more of UE acceleration, UE rotation, UE orientation, or any combinations thereof.

4. The method of claim 1, wherein the second measurement periodicity corresponds to a fastest measurement rate for measuring the one or more beams.

5. The method of claim 4, further comprising:

determining, based at least in part on measurements of the one or more beams according to the one-shot measurement mode, a third measurement periodicity for one or more beam measurements subsequent to the second time period.

6. The method of claim 5, wherein the third measurement periodicity corresponds to the first measurement periodicity, the second measurement periodicity, or a different measurement periodicity than the first measurement periodicity or the second measurement periodicity.

7. The method of claim 1, wherein the first measurement periodicity is a product of a first sampling multiplier and a reference time period, and the second measurement periodicity is a product of a second sampling multiplier and the reference time period, and wherein the second sampling multiplier is less than the first sampling multiplier.

8. The method of claim 7, wherein:

the first sampling multiplier is greater than one to provide that the first measurement periodicity is a multiple of two or more reference time periods, and the second sampling multiplier is equal to one to provide that the second measurement periodicity corresponds to one measurement per reference time period.

9. The method of claim 7, wherein the reference time period is provided in a synchronization signal block (SSB) measurement and timing configuration (SMTC) from a network entity.

10. The method of claim 1, wherein the measuring the one or more beams according to the second measurement periodicity comprises:

triggering the one-shot measurement mode at a fastest measurement rate, and wherein a subsequent measurement frequency is determined based at least in part on a rate of change of one or more measurements of the one-shot measurement mode.

11. The method of claim 1, further comprising:

initiating one or more of a beam switch or a cell handover based at least in part on the measuring the one or more beams according to the second measurement periodicity.

12. The method of claim 1, wherein the motion sensor is an inertial measurement unit (IMU) that includes one or more of an accelerometer, a gyroscope, or a magnetic sensor.

13. A user equipment (UE) for wireless communication, comprising:

one or more memories storing processor-executable code; and one or more processors coupled with the one or more memories and individually or collectively operable to execute the code to cause the UE to:

measure, during a first time period, one or more beams according to a first measurement periodicity;

determine, based at least in part on an indication from a motion sensor, that a movement of the UE exceeds a first movement threshold value; and measure, during a second time period and based at least in part on the determination that the UE exceeds the first movement threshold value, the one or more beams according to a second measurement periodicity to obtain a second set of measurements, wherein the second measurement periodicity is greater than the first measurement periodicity, and wherein the one or more beams are measured in accordance with a one-shot measurement mode at the second measurement periodicity, and wherein the one-shot measurement mode includes a measurement of each reference signal instance during the second time period.

14. The UE of claim 13, wherein the one or more processors are individually or collectively further operable to execute the code to cause the UE to:

determine that the movement of the UE is less than a second movement threshold value for a first time period prior to the indication from the motion sensor that the movement of the UE exceeds the first movement threshold value.

15. The UE of claim 13, wherein the motion sensor indicates one or more of UE acceleration, UE rotation, UE orientation, or any combinations thereof.

16. The UE of claim 13, wherein the second measurement periodicity corresponds to a fastest measurement rate for measuring the one or more beams.

17. The UE of claim 16, wherein the one or more processors are individually or collectively further operable to execute the code to cause the UE to:

determine, based at least in part on measurements of the one or more beams according to the one-shot measurement mode, a third measurement periodicity for one or more beam measurements subsequent to the second time period.

18. The UE of claim 17, wherein the third measurement periodicity corresponds to the first measurement periodicity, the second measurement periodicity, or a different measurement periodicity than the first measurement periodicity or the second measurement periodicity.

19. The UE of claim 13, wherein the first measurement periodicity is a product of a first sampling multiplier and a reference time period, and the second measurement periodicity is a product of a second sampling multiplier and the reference time period, and wherein the second sampling multiplier is less than the first sampling multiplier.

20. The UE of claim 19, wherein:
the first sampling multiplier is greater than one to provide that the first measurement periodicity is a multiple of two or more reference time periods, and
the second sampling multiplier is equal to one to provide that the second measurement periodicity corresponds to one measurement per reference time period.

21. The UE of claim 19, wherein the reference time period is provided in a synchronization signal block (SSB) measurement and timing configuration (SMTC) from a network entity.

22. The UE of claim 13, wherein, to measure the one or more beams according to the second measurement periodicity, the one or more processors are individually or collectively further operable to execute the code to cause the UE to:
trigger the one-shot measurement mode at a fastest measurement rate, and wherein a subsequent measurement frequency is determined based at least in part on a rate of change of one or more measurements of the one-shot measurement mode.

23. The UE of claim 13, wherein the one or more processors are individually or collectively further operable to execute the code to cause the UE to:
initiate one or more of a beam switch or a cell handover based at least in part on the measuring the one or more beams according to the second measurement periodicity.

24. The UE of claim 13, wherein the motion sensor is an inertial measurement unit (IMU) that includes one or more of an accelerometer, a gyroscope, or a magnetic sensor.

25. An apparatus for wireless communication at a user equipment (UE), comprising:
means for measuring, during a first time period, one or more beams according to a first measurement periodicity;
means for determining, based at least in part on an indication from a motion sensor, that a movement of the UE exceeds a first movement threshold value; and
means for measuring, during a second time period and based at least in part on the determination that the UE exceeds the first movement threshold value, the one or more beams according to a second measurement periodicity to obtain a second set of measurements, wherein the second measurement periodicity is greater than the first measurement periodicity, and wherein the one or more beams are measured in accordance with a one-shot measurement mode at the second measurement periodicity, and wherein the one-shot measurement mode includes a measurement of each reference signal instance during the second time period.

26. The apparatus of claim 25, wherein the second measurement periodicity corresponds to a fastest measurement rate for measuring the one or more beams.

27. The apparatus of claim 26, further comprising:
means for determining, based at least in part on measurements of the one or more beams according to the second measurement periodicity, a third measurement periodicity for one or more subsequent beam measurements, wherein the third measurement periodicity corresponds to the first measurement periodicity, the second measurement periodicity, or a different measurement periodicity than the first measurement periodicity or the second measurement periodicity.

28. A non-transitory computer-readable medium storing code for wireless communication at a user equipment (UE), the code comprising instructions executable by one or more processors to:
measure, during a first time period, one or more beams according to a first measurement periodicity;
determine, based at least in part on an indication from a motion sensor, that a movement of the UE exceeds a first movement threshold value; and
measure, during a second time period and based at least in part on the determination that the UE exceeds the first movement threshold value, the one or more beams according to a second measurement periodicity to obtain a second set of measurements, wherein the second measurement periodicity is greater than the first measurement periodicity, and wherein the one or more beams are measured in accordance with a one-shot measurement mode at the second measurement periodicity, and wherein the one-shot measurement mode includes a measurement of each reference signal instance during the second time period.

29. The non-transitory computer-readable medium of claim 28, wherein the second measurement periodicity corresponds to a fastest measurement rate for measuring the one or more beams.

30. The non-transitory computer-readable medium of claim 29, wherein the instructions are further executable by the processor to:
determine, based at least in part on measurements of the one or more beams according to the second measurement periodicity, a third measurement periodicity for one or more subsequent beam measurements, wherein the third measurement periodicity corresponds to the first measurement periodicity, the second measurement periodicity, or a different measurement periodicity than the first measurement periodicity or the second measurement periodicity.

* * * * *